(12) United States Patent
Abney (10) Patent No.: US 10,991,034 B2
(45) Date of Patent: Apr. 27, 2021

(54) STYLIST LOCATOR

(71) Applicant: Matthew Abney, Alexandria, VA (US)

(72) Inventor: Matthew Abney, Alexandria, VA (US)

(*) Notice: Subject to any disclaimer, the term of this patent is extended or adjusted under 35 U.S.C. 154(b) by 416 days.

(21) Appl. No.: 15/716,498

(22) Filed: Sep. 26, 2017

(65) Prior Publication Data
US 2019/0095871 A1    Mar. 28, 2019

(51) Int. Cl.
G06Q 30/00 (2012.01)
G06Q 30/06 (2012.01)
G06Q 10/10 (2012.01)
H04W 4/02 (2018.01)
G06Q 50/10 (2012.01)
G06Q 10/06 (2012.01)

(52) U.S. Cl.
CPC . G06Q 30/0639 (2013.01); G06Q 10/063112 (2013.01); G06Q 10/1095 (2013.01); G06Q 30/0621 (2013.01); G06Q 30/0623 (2013.01); G06Q 30/0633 (2013.01); G06Q 50/10 (2013.01); H04W 4/02 (2013.01)

(58) Field of Classification Search
CPC . G06Q 30/0601–0645; G06Q 30/0621; G06Q 30/0633; G06Q 30/0623; G06Q 30/0639
USPC ......... 705/26.1–27.2, 26.9, 26.5, 26.8, 26.61
See application file for complete search history.

(56) References Cited

U.S. PATENT DOCUMENTS

| | | | |
|---|---|---|---|
| 2006/0089873 A1* | 4/2006 | Stewart, Jr. ............ | G06Q 30/02 705/14.49 |
| 2011/0231260 A1* | 9/2011 | Price ..................... | G06Q 30/02 705/14.61 |
| 2012/0066018 A1* | 3/2012 | Piersol ............... | G06Q 10/0631 705/7.14 |
| 2014/0278671 A1 | 9/2014 | Leonhardt et al. | |

(Continued)

OTHER PUBLICATIONS

Pasquarelli, Adrianne. These beauty startups bring the salon to your apartment: Glamsquad, Priv, others attract funds as they blow away the competition. Sep. 8, 2014. Crain's New York Business. (Year: 2014).*

(Continued)

*Primary Examiner* — Allison G Wood
(74) *Attorney, Agent, or Firm* — Gregory M. MacDonald, Esq.

(57) ABSTRACT

The present invention relates to a method for on-demand beauty services that (1) considers the time and expense of the stylist traveling to meet the customer at her present location or another location, (2) provides a specific recommendation based on the user's requirements and schedules, the stylist's skills, and availability, and (3) provides the necessary other steps of the transaction, such as scheduling the appointment, handling the billing, resolving disputes, and integrating reviews back into the model. The present invention interprets the customer's location from either the customer's input or the GPS on the customer's smart phone to determine the location for the services. The stylist's location may also be determined based on the stylist's (Continued)

inputted location or the GPS on the smart phone of the stylist. The distance between the customer and the stylist is determined by receiving the GPS location from the smart phones of the customer and the stylist and interpreting this data.

8 Claims, 5 Drawing Sheets

(56) References Cited

U.S. PATENT DOCUMENTS

| | | | | |
|---|---|---|---|---|
| 2015/0058324 | A1* | 2/2015 | Kauwe | G06F 16/284 707/722 |
| 2015/0348049 | A1* | 12/2015 | Todasco | G06Q 10/02 705/5 |
| 2015/0350377 | A1 | 12/2015 | Iyer et al. | |
| 2017/0024393 | A1* | 1/2017 | Choksi | G06Q 40/12 |
| 2017/0091840 | A1* | 3/2017 | Gaubert | G06Q 30/0282 |
| 2017/0220966 | A1* | 8/2017 | Wang | G06Q 50/30 |
| 2017/0293950 | A1* | 10/2017 | Rathod | G06Q 30/02 |
| 2018/0101894 | A1* | 4/2018 | Markoff | G06Q 30/0641 |
| 2018/0202821 | A1* | 7/2018 | Yu | G01C 21/3423 |
| 2018/0211292 | A1* | 7/2018 | Fang | G06Q 30/04 |

OTHER PUBLICATIONS

Blow Me. Updated Sep. 30, 2015. htttps://play.google.com/store/apps/details?id=com.brounie.Blowme&hl=en.

The Glam App. 2017. https://www.theglamapp.com/.

Priv—Beauty & Wellness Services to your Door, Updated: Aug. 11, 2017. https://itunes.apple.com/us/app/priv-beauty-wellness-services-to-your-door/id796726649?mt=8.

The professional on-demand beauty app—StyleBee, 2017. https://www.stylebee.com/.

BeGlammed: Makeup and hair stylists come directly to you, 2017. https://www.beglammed.com/.

Makeup | GlamSquad, 2017. https://www.glamsquad.com/styles/makeup/.

* cited by examiner

STYLIST LOCATOR

CROSS-REFERENCE TO RELATED APPLICATION

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR

Not Applicable

BACKGROUND

Unless otherwise indicated herein, the materials described in this section are not prior art to the claims in this application and are not admitted to be prior art by inclusion in this section.

1. Field of the Invention

The present invention relates generally to a method and system for scheduling and invoicing for appointments. More particularly, the present invention relates to a method and system for a salon service provider to automatically schedule and invoice for appointments that take place at the customer's location.

2. Description of Related Art

Increasingly busy schedules have increased the need for on-demand service. With the constant technological improvements of smart phones and smart devices, on-demand services such as food delivery and instant transportation requests have become an integral part of everyday life. However, these services merely identify the type of services in a general area and may list a general review of others. Also, these services fail to consider the time and expense of the stylist traveling to meet the customer at his present location or another designated location. In addition, these services fail to provide a specific recommendation based on the user's requirements, the stylist's skills, schedule, and availability. These existing services also fail to provide the necessary other steps of the transaction, such as scheduling the appointment, handling the billing, resolving disputes, and integrating reviews back into the model. Thus, there is a need for a service that provides these and other features.

BRIEF SUMMARY OF THE INVENTION

It is a principal object to solve at least one of the disadvantages with other attempted solutions or to create other utility by providing a method and system that establishes an effective option for on-demand beauty services that (1) considers the time and expense of the stylist traveling to meet the customer at his present location or another location, (2) provides a specific recommendation based on the customer's requirements and schedules, and the stylist's skills and availability, and (3) provides the necessary other steps of the transaction, such as scheduling the appointment, handling the billing, resolving disputes, and integrating reviews back into the model. The present invention is a special purpose host computer system that has a nontransitory computer readable medium with one or more processors that execute an algorithm that interprets the customer's location from either the customer's input or the GPS on the customer's smart phone to determine the location for the services. The customer may also input a planned location, where services will be performed. The stylist's location may be determined based on the stylist's inputted location or the GPS on the smart phone of the stylist. The distance between the customer and the stylist is determined by receiving the GPS location from the smart phones of the customer and the stylist and interpreting this data. This information is used by a special purpose host computer system to calculate the travel costs, while considering the time of travel and other costs, such as toll bridges, toll roads, parking, charges for traveling in a car pool lane, carbon footprint effect, car wear, gas prices, autonomous vehicle charges, etc. A customer may find an available nearby stylist based on service and skill using this method and system. The stylist requested is paid based on the distance he or she travels in order to get to the customer, and her hourly rate for services.

The present invention presents a variety of pages for a customer or a stylist on the screen of a smart phone or comparable device. The customer and stylist selects the type of user she is on the sign-in page. The customer enters the required information into the sign-in page, desired factors for a stylist (e.g. location, service, skill, etc.), and ranks the importance of each factor. Based on this information, a list of available local stylists is generated by the system. The list is then displayed on the customer's smartphone in the order of best match. The customer finds and contacts a stylist via the search page. The customer inputs required information so that a stylist who provides a service via the present invention may invoice the customer. The customer may view the current and past services purchased by the customer.

A stylist enters the required information into a sign-in page and an input page. The stylist may also add and edit her schedule in the schedule page. The system generates invoices through the payments page. The stylist may interact directly with a customer through the contact page. An alternate embodiment of the present invention features a review page that allows customers to provide feedback regarding a service from a stylist.

In at least one embodiment of the invention, a special purpose host computer system provides an application that may be downloaded on both the stylist's and customer's smart phones, tablets, or other devices, which serve to effectively and efficiently provide on-demand beauty services to customers.

BRIEF DESCRIPTION OF THE DRAWINGS

The accompanying drawings, which are incorporated in and constitute a part of this specification, illustrate several aspects described below.

DETAILED DESCRIPTION OF THE INVENTION

It is to be understood that this invention is not limited to any particular embodiment described, which may vary. Also, it is to be understood that the terminology used herein is for the purpose of describing particular embodiments only, and is not intended to be limiting, since the scope of this invention will be limited only by the appended claims.

In the following detailed description, numerous specific details are set forth in order to explain and provide a thorough understanding of the present invention. However, it is apparent that the present invention may be practiced without all of these specific details. Thus, all illustrations of the drawings are for the purpose of describing versions of the present invention, and are not intended to limit the scope of the invention.

In the following section, the present invention is described fully by referencing the details in the enclosed drawings, which illustrate certain embodiments of the invention. The numbers shown in this specification refer to the corresponding numbers in the enclosed drawings. The terminology used is to describe the particular embodiment shown and is not intended to limit the scope of the invention. The invention may also be embodied in many other forms in addition to the embodiments shown. Thus, the embodiments shown should not be construed as limiting, but rather, to allow a thorough and complete description of the disclosure that conveys the scope of the invention to a person having ordinary skill in the art in the field of this invention. Therefore, for the terms used herein, the singular forms "the," "a," and "an" are intended to include the plural forms as well as the singular forms, unless the context clearly indicates otherwise. The term "and" includes any and all combinations of one or more of the associated listed items. As used herein, the terms "comprising" and "comprises" when used in this specification, identify specific steps, integers, operations, features, components, and elements, but do not preclude the presence or addition of one or more other steps, operations, features, components, and elements. In addition, the features, components, and elements referenced may be exaggerated for clarity.

Unless otherwise defined, all scientific terms, technical terms, or other terms used herein have the same meaning as the term that is understood by one having ordinary skill in the art in the field of this invention. It is also understood that these terms, including their dictionary meaning, should be understood as having the meaning, which is consistent with their definitions in the related relevant art. In addition, the present disclosure is not to be interpreted in an idealized or overly formal sense unless expressly stated so herein. Constructions or functions that are well known in the art may not be fully described in detail for brevity.

In describing the invention, it is understood that a number of steps and methods may be disclosed. Each of these may have individual benefit. Also, each may be used in conjunction with at least one or more of the disclosed steps and methods. Therefore, this description will refrain from stating each and every possible combination of the individual steps and methods for the sake of brevity. Regardless, the specification and related claims should be understood with the combinations that are entirely within the scope of the claims and inventions.

The disclosure in this invention are examples of how it may be implemented and are not intended to limit the scope of the invention to the specific embodiments shown in the accompanying drawings or the description provided herein. The present invention will now be described by example in the following paragraphs by referencing the accompanying drawings, which represent embodiments and alternative embodiments.

All illustrations of the drawings are for the purpose of describing selected versions of the present invention and are not intended to limit the scope of the present invention. The present invention presents a variety of pages for a customer or a stylist on the screen of a smart phone or comparable device.

The method comprises receiving data from a customer smart phone or other device, over a cellular, wireless, satellite, or other network to a special purpose computer with a non-transitory computer readable medium. In one or more of the embodiments, the functions described herein may be implemented in any combination of hardware, software, firmware, etc. The functions may be stored or transmitted as one or more software instructions, computer-executable instructions, or processor-executable instructions, or code on a tangible non-transitory computer readable medium or on a non-transitory processor-readable storage medium, if implemented in software. The steps of an algorithm, process, or method disclosed herein may be embodied in a processor-executable software module that may reside on a non-transitory computer readable medium. Non-transitory computer readable medium readable media includes both computer storage media and communication media including any medium that facilitates transfer of a computer program from one place to another. A non-transitory storage media may be any available media that may be accessed by the special purpose host computer system.

Also, combinations of the above should be included within the scope of non-transitory computer readable medium. In addition, the operations of an algorithm, process, or method may reside as one or any combination or codes, set of codes, instructions, or sets of instructions on a non-transitory machine readable medium, which may be incorporated into a computer program product.

By way of an example, and not as a limitation, a non-transitory computer readable medium may comprise Random-Access Memory ("RAM"), Read-Only Memory ("ROM'), Programmable Read-Only Memory ("PROM"), Erasable Programmable Read-Only Memory ("EPROM"), Electrically Erasable Programmable Read-Only Memory ("EEPROM"), Compact Disc Read-Only Memory ("CD-ROM") or other optical disk storage, magnetic disk storage, or other optical or magnetic storage devices, or any other medium that may be used to store program code in the form of instructions or data structures and that may be accessed by a computer. Disk and disc, as used herein, includes compact disc ("CD"), laser disc, optical disc, digital versatile disc ("DVD"), floppy disk, and blu-ray disc where disks usually reproduce data magnetically or optically with lasers.

Also, combinations of the above should be included within the scope of non-transitory computer readable medium. In addition, the operations of an algorithm, process, or method may reside as one or any combination or codes, set of codes, instructions, or sets of instructions on a non-transitory machine readable medium or an a non-transitory computer readable medium, which may be incorporated into a computer program product. All illustrations of the drawings are for the purpose of describing selected versions of the present invention and are not intended to limit the scope of the present invention.

Figure 1:
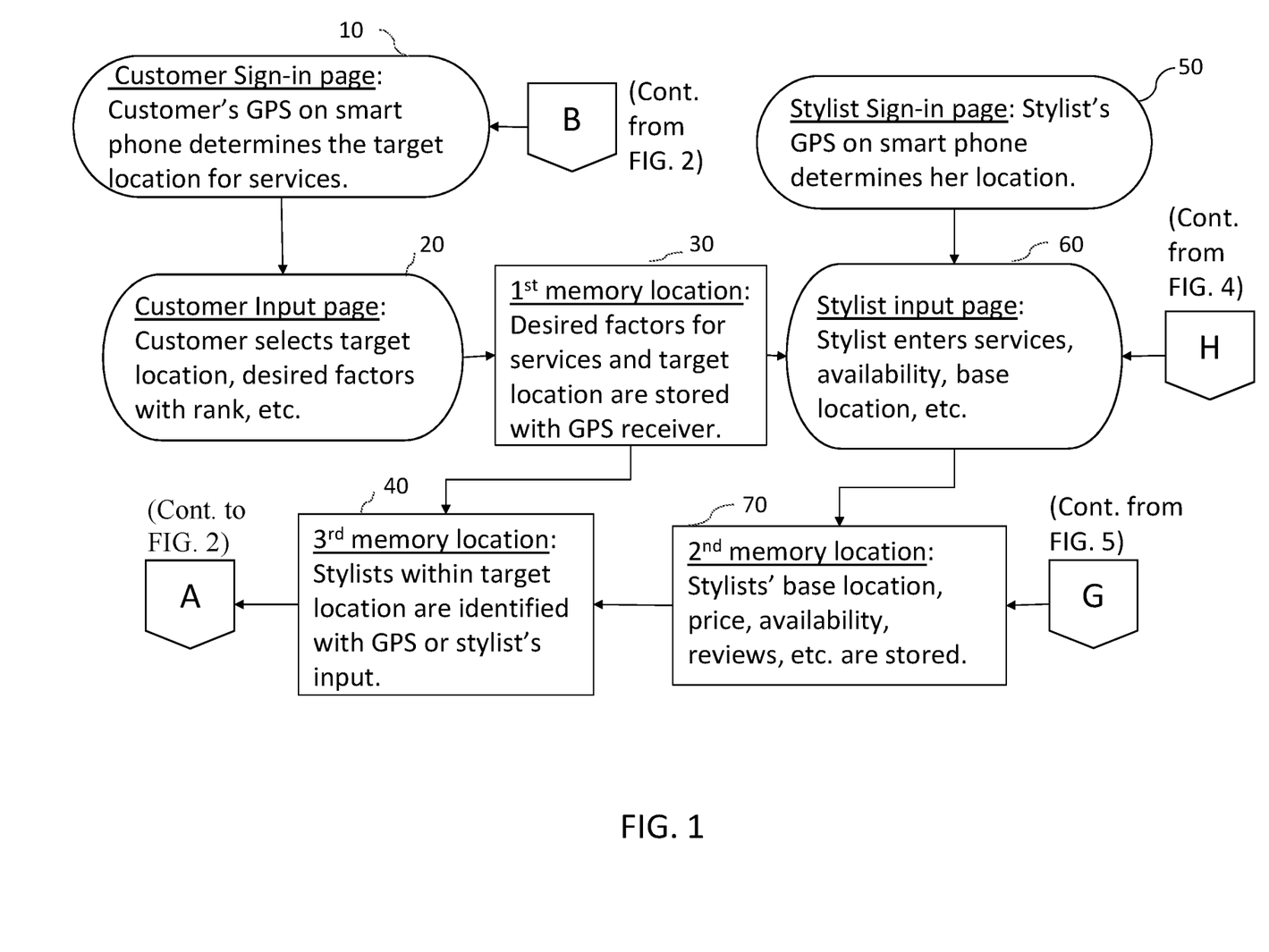
FIG. 1 is a flowchart of the configuration of the sign-in page and input page for the customer and for the stylist, and details regarding the memory locations, which may be used in at least one of the embodiments of this invention.

As shown in FIG. 1, a customer logs-in on a smart phone or comparable device, and enters the required information into the customer sign-in page 10, which presents a customer with a variety of textboxes and selections. In at least one embodiment, the sign-in page 10 requires a customer to input a username and a password into the corresponding textboxes. The customer sign-in page 10 also requires the customer to select the type of user, and in the case of a customer, the user selects the customer selection. The selection may be a checkbox, a drop box, or a variety of other selections that differentiate the type of users. The customer sign-in page 10 also allows a user to create a profile or reset a username and a password.

As shown in FIG. 1, the global positioning system navigational system ("GPS") in the stylist's smart phone records the location of the customer 10. The current location of the customer is identified via the GPS in the customer's smart phone and is delivered from the system to the stylist smart phone 30. An alternate embodiment of the present invention may comprise a map feature that provides directions for the stylist and provides the customer with an estimated time of arrival of the stylist. As shown in FIG. 1, on the customer input page 20, the customer enters desired factors for a stylist (e.g. location, service, skill, etc.) and ranks importance of each factor 20.

Also, as shown in FIG. 1, in the first memory location 30, the target location is stored. The target location is the general vicinity in which the customer desires to meet the stylist for the services. The target location is determined based on the customer's location or the location inputted by the customer on the customer input page 20. In the third memory location, local stylists who are located within the target location are identified and stored 40.

In addition, as shown in FIG. 1, a stylist enters the required information into the stylist sign-in page 50. The stylist inputs a username and a password into the corresponding textboxes and selects the type of user through the stylist selection 50. The stylist selection may be a checkbox, a drop box, and a variety of other selections that differentiate the type of users. The stylist sign-in page allows a stylist to create a profile or create or reset a username and a password 50.

Furthermore, as shown in FIG. 1, once logged into the application, the stylist engages with a variety of pages. The stylist inputs a variety of personal information that is viewable by a variety of customers in a stylist input page 60. The stylist input page allows a stylist to edit and input her name, a set of services the stylist may perform, a profile picture, a base location, and allows a stylist user to upload her resume 60. The stylist's base location, which is stored within the second memory location 70, is used as the beginning point when calculating the cost of travel time to the customer's target location 30, which is stored within the first memory location.

As shown in FIG. 1, a prior customer review may be presented on the stylist input page so that other customers may view the review 60. As shown in FIG. 1, information is stored in a second memory location 70 that is based on the information inputted in the stylist input page 60.

Accordingly, the present invention is a computer-implemented method and system for locating a stylist. It may comprise a non-transitory computer readable medium with instructions stored thereon that are executed by a processor. It comprises the steps of receiving specifications from a customer's smart phone regarding services desired in the location designated by the GPS in the customer's smart phone. This information is then stored in a first memory location 30. A list of services and location based prices are received from available stylists 60. This information is stored in a second memory location 70.

Overall, as shown in FIG. 1, the present invention comprises a host computer system for locating a stylist. It may comprise at least two smart phones, one for a customer 10 and one for a stylist 50, where both contain a GPS for transmitting the location of each smart phone. A host computer system with a GPS receiver, records the customer's location in a first memory location along with specifications regarding services desired 30. A host computer system with a GPS receiver, also records the stylist's location, which can also be entered by the stylist if a home or office location is desired for the base location in a second memory location along with prices from available stylists 70. A third memory location stores a list of stylists 40, which are generated by a processor.

Figure 2:
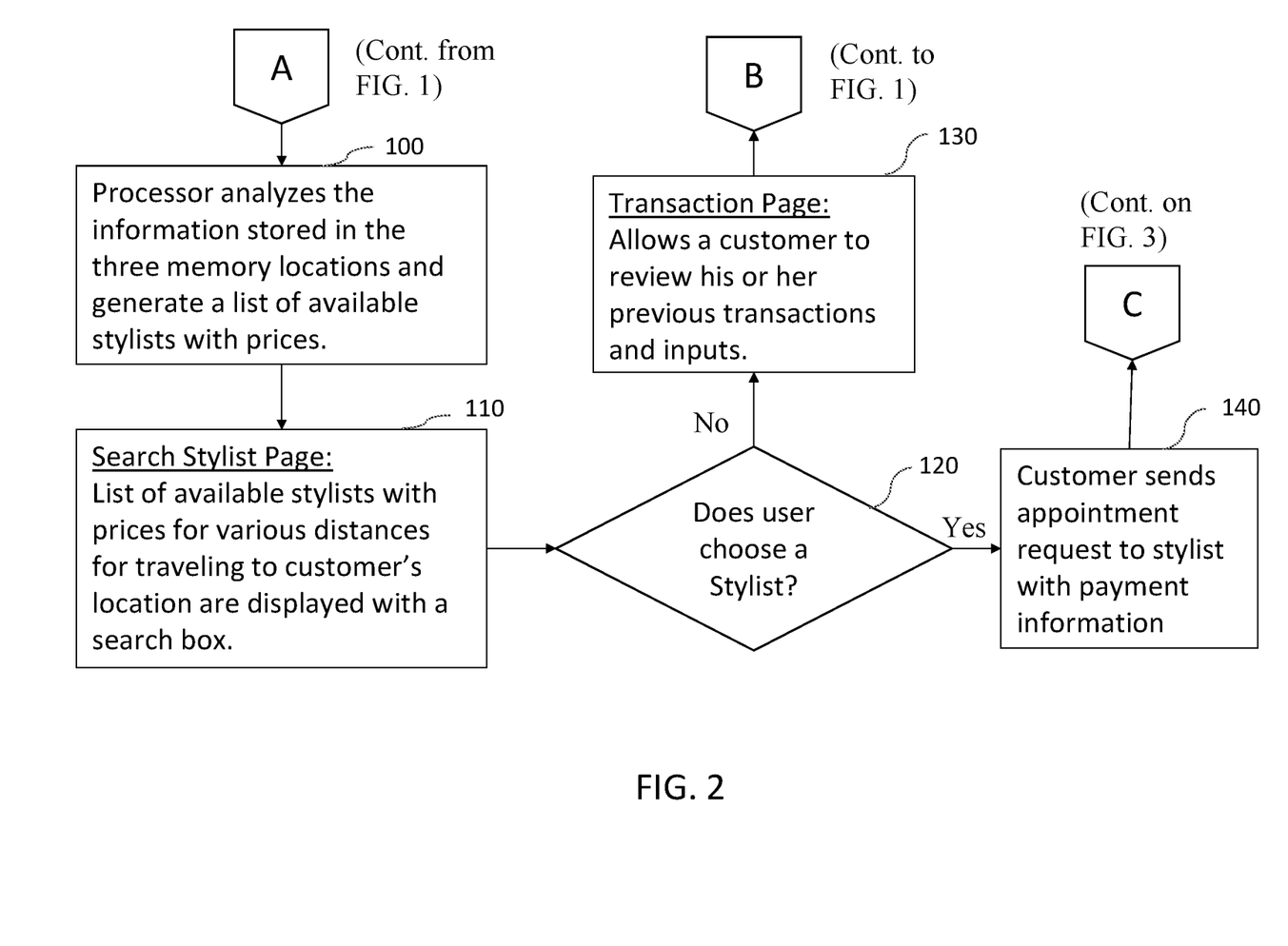
FIG. 2 is a flowchart of the transaction page where one or more processors analyze the information stored in the memory locations and generate a list of available stylists, which may be used in at least one of the embodiments of this invention.

As shown in FIG. 2, one or more processors analyze the information stored in the three memory locations and generate a list of available local stylists 100. The list is then displayed on the customer's smartphone in the order of the best match 110. The list of available local stylists includes the prices for the stylist to travel to the customer's location 110. The user reviews the list of local stylists and decides if he wants to transact business with a desired local stylist 120. The transactions page allows a customer to review his previous transactions 130.

Also, as shown in FIG. 2, the transactions page presents a list of the completed transactions between the customer and the stylist 130. Each transaction presents the type of service, the price, the location of the customer, the location of the stylist performing the services, and the service and skill of the stylist 130.

In addition, as shown in FIG. 2, the customer may then proceed to browse through the available stylists 110 and select a chosen stylist 120. The search stylist page may enable a variety of filters that present a customer with stylists that may meet the needs of the customer 110. Such filters may be based on the location of the customer 10, the location of the stylist 50, and information regarding the stylist, such as the specialty of the stylist, price, availability, reviews, and the store or company associated with the stylist 60. The customer may also input keywords into a search box, view the available times of the stylist, and view the prices of the stylists 110. The customer may select a stylist with an appointment request 120 and contact the chosen stylist based on the contact information offered to the customer 140.

Furthermore, as shown in FIG. 2, in at least one embodiment of the present invention, a customer is allowed to select a stylist that is available to provide a service near the customer 110. A customer is then charged for a service based on the distance the stylist travels from her previous location to the customer 100. In at least one embodiment, the present invention may require the customer to input her payment information prior to the service provided, and may require the customer to confirm the completion of the service before the stylist user receives payment for the service 140.

In other words, a processor generates a list of stylists by comparing the information in the first memory location with the information in the second memory location. The results are stored in a third memory location 100. Next, the customer's selection for a stylist is received 120. A processor then calculates the current cost for the selected stylist based on the target location of the customer 30. The processor further displays information regarding the available stylists 110. The processor also receives the customer's selection for a stylist, and calculates the current cost for the selected stylist based on the current location of the customer's smart phone as determined by its GPS 120. The processor then transmits an appointment request to the local stylist 140. In at least one embodiment, the host computer system may display a transactions page for the customer to review his previous transactions and inputs 130.

Figure 3:
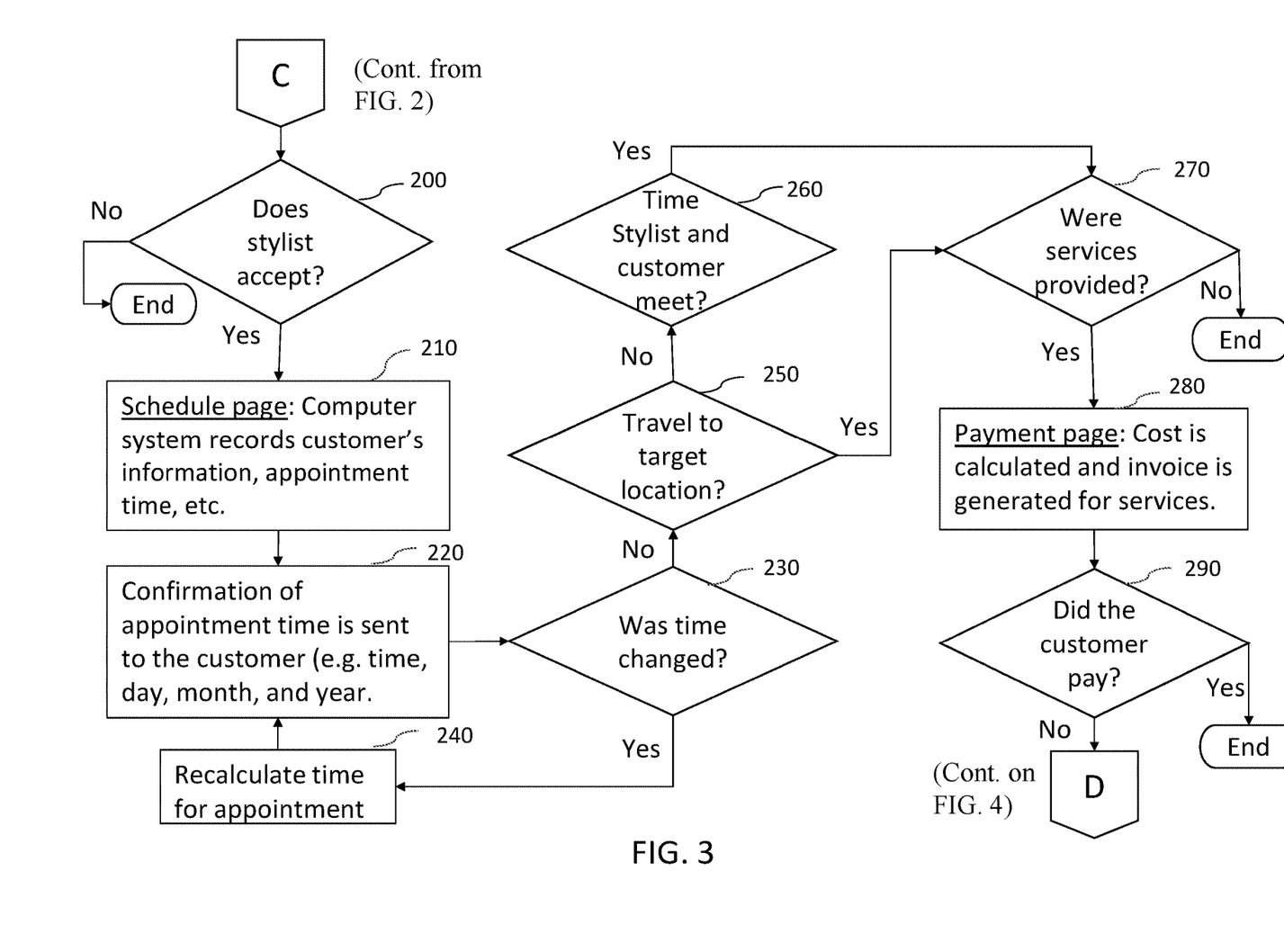
FIG. 3 is a flowchart of the method that includes a schedule page where the system records the information and scheduled appointment time, and a payments page where an invoice is generated by the system based on the type of service, location, customer, stylist, and other factors, which may be used in at least one of the embodiments of this invention.

As shown in FIG. 3, if the stylist wishes to accept an appointment 200, the system records the customer's information and appointment time 210 and sends the appointment time to the customer. The system. In at least one embodiment of the schedule page, the system confirms a service request by a customer based upon approval by the stylist 220. The schedule page may display the schedule of the stylist user by a time, day, month, and year 220.

Also, as shown in FIG. 3, the host computer system monitors whether the appointment time was changed by either the customer or the stylist 230. If so, the host computer system recalculates the time for the appointment 240.

In at least one embodiment, a timer unit in the host computer system records the time that the stylist travels from her base location 70 to the customer's target location 30, which may also be the customer's smart phone location 10. If round-trip travel is being charged by the stylist to the customer, the timer unit will also record the time required for the stylist to travel from the customer's target location 30 back to her base location 70. The travel time will automatically be billed to the customer 280.

In at least one alternative embodiment, the timer unit may be programmed so that it only calculates the travel time from the stylist's base location 70 to the target location 30 on the day of the appointment, or within any time interval designated by the stylist. This feature prevents an invoice from being generated if the stylist travels to the target location for other reasons.

In at least one other alternative embodiment, the stylist will have the option of confirming that an appointment with the customer took place 270, before an invoice is automatically sent 280 by the timer unit. The stylist will also have the ability to adjust the time recorded by the timer unit in the event that the stylist made an unrelated stop when traveling to or from the stylist. The GPS receiver on the host computer monitors the stylist's GPS transmitter on the stylist's smart phone to determine if she travels to the target location 250. If so, the host computer system may be configured to request either the stylist or the customer or both to confirm that the appointment has taken place 270. For example, if the GPS transmitter on the stylist's smart phone determines that the stylist traveled within a close proximity of the target location, the host computer system will inquire to see if the appointment has taken place. This automatic prompt allows either the stylist, the customer, or both to confirm with a single click on a smart phone that an appointment has taken place. This allows the host computer system to then immediately generate an invoice without further action.

Otherwise, the system may assume that the appointment took place during the time that the timer unit recorded the smart phones of the customer and stylist were in close proximity. The system would then automatically generate an invoice for the time based on the stylist's hourly rate for services and the time the stylist spent traveling.

The host computer system may also monitors the customer's GPS transmitter on his smart phone in addition to the stylist's GPS transmitter on her smart phone to determine if both the customer and stylist are ever in close proximity to each other, or just during the time of the scheduled appointment 260. The timer unit may calculate the amount of time that the stylist and customer meet 260. This allows the host computer to calculate the cost for services provided based on the stylist's hourly rate 280. In at least one alternative embodiment, when the customer is not meeting the stylist at the target location, the GPS receiver that is connected to the host computer may monitor the GPS of the customer's smart phone 10 and the GPS of the stylist's smart phone 50 to determine if an appointment takes place.

For example, suppose the customer calls the stylist shortly before the appointment, and requests to meet at a location other than the target location 30. If there is not time for the target location to be updated on the host computer system, the host computer system may still monitor the GPS on the smart phones of the customer and stylist to see if the customer and stylist meet at any location. If the host computer system detects that both smart phones are in the same general vicinity, the host computer system may record the appointment time with the timer unit and automatically generate an invoice, or optionally prompt either the stylist, the customer, or both to confirm if an appointment has taken place. When the host computer system determines services were provided to the customer 270, the cost of the service provided is recorded on a payment page 280. The payment page 280 presents a customer with an invoice, which may be based on the distance traveled by the stylist or a combination of the distance traveled and the service provided by the stylist. The stylist may also monitor invoices that the systems sends to customers through the payments page 280. Each payment presents the type of service, the price, and the location of where the services were provided 280. The payment page 280 uses the customer's credit card information or account information, so that the stylist is paid after the service is completed 290.

Figure 4:
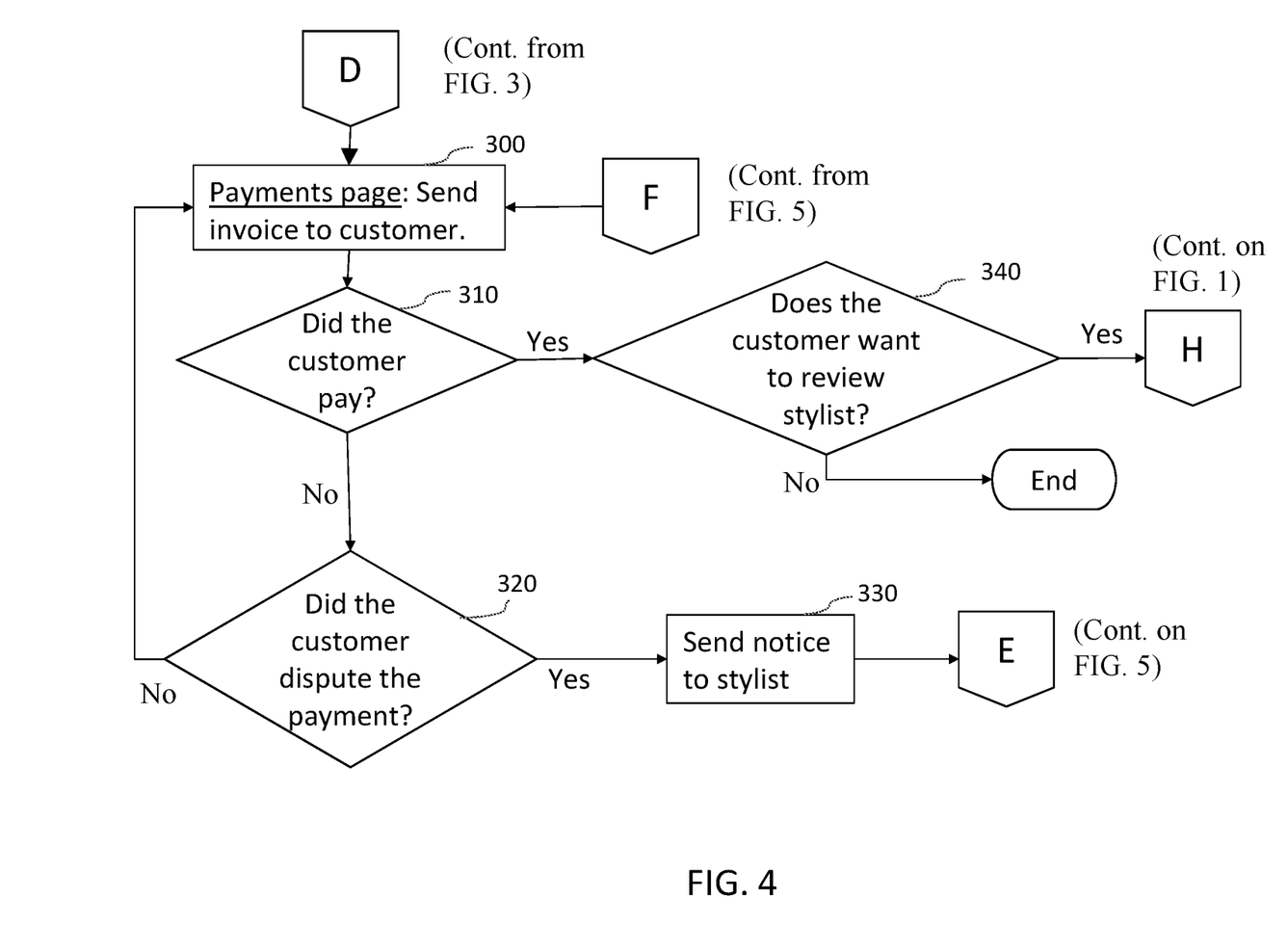
FIG. 4 is a flowchart of the method that includes a payments page, where an invoice is sent from the computer system to the customer, and where the customer may dispute payments and review a stylist, which may be used in at least one of the embodiments of this invention.

As shown in FIG. 4, the system sends an invoice to the customer for the services that were provided 300. Also, as shown in FIG. 4, the computer system determines if the customer paid for the services that were provided 310. As shown in FIG. 4, if the customer disputes a transaction 320, a notice is sent to the stylist 330. In addition, a customer may write a review of the service of the stylist 340, so that the review appears on the stylists input page 60, as shown in FIG. 1. If, the customer chooses to review the stylist, he selects the type of service provided and the corresponding survey is displayed. The survey presents a variety of questions regarding the service provided. The survey may include customer's satisfaction with price, style, and so on.

Figure 5:
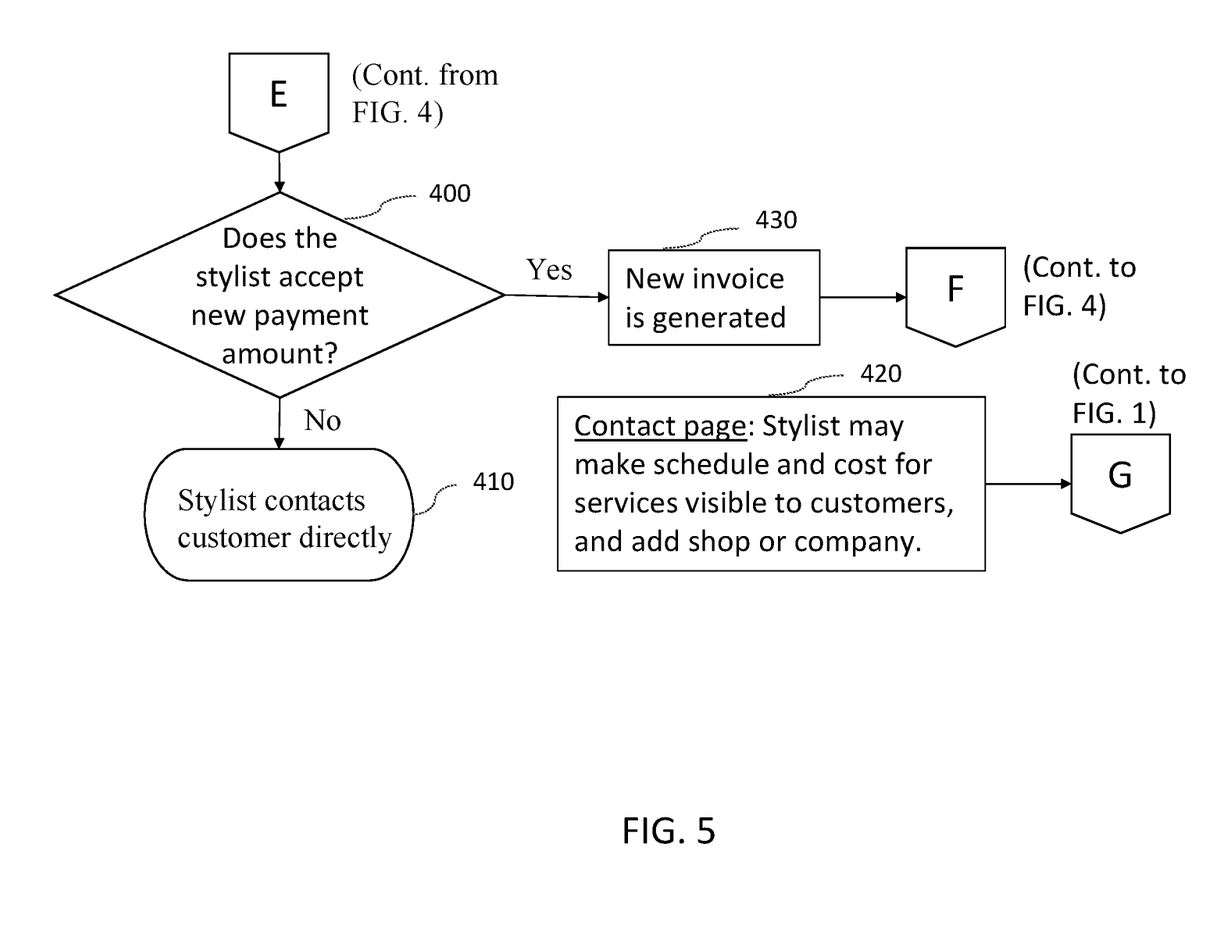
FIG. 5 is a flowchart that includes a contact page, where the stylist may make parts of her schedule visible to customers, input the cost for her services, and affiliate herself with a shop or company, which may be used in at least one of the embodiments of this invention.

As shown in FIG. 5, the stylist user may accept or decline the disputed transaction of the customer 400. If the stylist does not accept the customer's new proposed cost for the services rewarded, she may contact the customer directly 410. Otherwise, a new invoice is generated 430. The stylist may input and edit her contact information through the contact page 420. The contact page allows the stylist user to make parts of her schedule visible to customers. The contact page also allows the stylist to input the cost of each service the stylist offers. In addition, the contact page allows the stylist user to affiliate herself with a shop or company 420. In the contact page the stylist may also make parts of her schedule visible to customers, input the cost of each service, and to affiliate herself with a shop or company 420.

In at least one embodiment, the customer could consider between a number of packages when choosing a stylist. For example, the customer may pay a minimal cost for the first package, where they have one choice and one salon. The customer may choose services on her makeup, hair, nails, eye brow threading, barbering, and massage therapy.

Alternatively, at a higher cost than the first package, the customer may choose the second package for three services and three salons in any area. The customer may also have access to on-line salon visit, where she can book with a salon and a stylist to meet her at her desired location, such as a home, business, or remote location. This option may also allow for salon services for up to three persons.

The third package may be for a higher cost than the second package and allow for up to seven customers to choose unlimited salons. This option may also allow the customers to change the appointment location up to three times.

A fourth package may allow for unlimited customers, salons, services, and locations. To specify the location of the appointment, some of these options may require additional information, such as a street address, a floor or room number, GPS coordinates, a general description of the area, and security information for entering a locked gate, such as a code or password. Other packages may allow the customer to modify the location of where the services are to be performed from the time the appointment is made to the time that the appointment takes place.

The stylist may sign up for free for the first package. This would allow them to book a client, indicate if they are attached to a salon, etc. Under this option, the stylist may be only able to link to one client at a time. The stylist may be able to text with the client and be paid in advance by PayPal, credit card, etc. Also, the stylist may be able to respond back to the customer with the time for the appointment by email, text, etc.

In the second package, the stylist may correspond with multiple clients by grouping within the texts or emails. This package may also allow the stylist to post or advertise with video clips or video chats through an iPhone, Android device, Skype, blog, or other similar communication devices.

In the third package, the stylist may be able to include additional information, such as license numbers, bonds, insurance, etc. This may be necessary if the stylist intends to travel to homes, businesses, or other remote locations.

Although the invention has been explained in relation to its preferred embodiment, it is to be understood that many other possible modifications and variations can be made without departing from the spirit and scope of the invention.

All of these embodiments and the invention disclosed herein are intended to be within the scope herein disclosed. These and other embodiments of the invention will become readily apparent to those skilled in the art from the detailed description of the preferred embodiments having reference to the attached figures, the embodiments not being limited to any particular, preferred embodiments disclosed. Also, the invention disclosed herein suitably may be practiced in the absence of any element which is not specifically disclosed herein.

What is claimed is:

1. A computer-implemented method for automatically scheduling and invoicing for appointments at remote locations, comprising the steps of:
receiving specifications from a customer's smart phone regarding services desired in the location designated by the GPS in the smart phone and storing this information in a first memory location;
receiving a list of services and location based prices from available stylists and storing this information in a second memory location;
generating, with a processor, a list of stylists by comparing the information in the first memory location with the information in the second memory location and storing this information in a third memory location;
receiving the customers selection for a stylist;
calculating, with a processor, the current cost for the selected stylist based on the current location of the customer's smart phone as determined by its GPS;
transmitting an appointment request to the local stylist;
monitoring, by a GPS receiver on a host computer system, a GPS transmitter on the stylist's smart phone and a UPS transmitter on the customer's smart phone:
determining the location of where the services were performed based on the monitoring;
determining if an appointment took place by determining if the smart phones of the customer and stylist were in close proximity;
calculating with a timer unit on the host computer system the time it required for a stylist to travel from her base location to a customer's smart phone location to perform the services;
calculating with a timer unit on the host computer system the time it required for a stylist to travel from the customer's smart phone location where the services were performed back to her base location;
recalculating the cost for the services based on the location of where the services were performed;
calculating, with a processor, the cost for the services performed based on the location of the customer's smart phone as determined by their GPS when the services were performed;
generating an invoice based on the cost of the services; and
transmitting an invoice for the services performed to the customer.

2. A non-transitory computer readable medium with instructions stored thereon, that when executed by a processor, performs the steps comprising:
receiving specifications from a customer's smart phone regarding services desired in the location designated by the GPS in the smart phone and storing this information in a first memory location;
receiving a list of services and location based prices from available stylists and storing this information in a second memory location;

generating a list of stylists by comparing the information in the first memory location with the information in the second memory location and storing this information in a third memory location;
receiving the customer's selection for a stylist;
calculating the current cost for the selected stylist based on the current location of the customer's smart phone as determined by its GPS;
transmitting an appointment request to the local stylist;
monitoring, by a GPS receiver on a host computer system, a GPS transmitter on the stylist's smart phone and a GPS transmitter on the customer's smart phone;
determining the location of where the services were performed based on the monitoring;
determining if an appointment took place by determining if the smart phones of the customer and stylist were in close proximity;
calculating with a timer unit on the host computer system the time it required for a stylist to travel from her base location to a customer's smart phone location to perform the services;
calculating with a timer unit on the host computer system the time it required for a stylist to travel back from the customer's smart phone location where the services were performed back to her base location;
recalculating the cost for the services based on the location of where the services were performed;
calculating, with a processor, the cost for the services performed based on the location of the customer's smart phone and the stylist's smart phone as determined by their UPS when the services were performed;
generating an invoice based on the cost of the services; and
transmitting an invoice for the services performed to the customer.

3. A host computer system for automatically scheduling and invoicing for appointments at remote locations, comprising:
   at least two smart phones with a UPS for determining the location of each smart phone;
   a computer with a UPS receiver;
   a timer unit on the host computer system:
   a first memory location for storing specifications from a customer's smart phone regarding services desired in the location designated by the GPS in the smart phone;
   a second memory location for storing a list of services and location based prices from available stylists;
   a third memory location for storing a list of stylists;
   a processor that generates a list of stylists by comparing the information in one or more memory locations;
   wherein the processor further receives the customer's selection for a stylist, calculates the current cost for the selected stylist based on the current location of the customer's smart phone as determined by its GPS, transmits an appointment request to the local stylist, monitors a GPS transmitter on a stylist's smart phone and a GPS transmitter on the customer's smart phone, determines the location of where the services were performed based on the monitoring, determines if an appointment took place by determining if the smart phones of the customer and stylist were in close proximity, calculates with a timer unit on the host computer system the time it required for a stylist to travel from her base location to a customer's smart phone location to perform the services, calculates with a timer unit on the host computer system the time it required for a stylist to travel back from the customer's smart phone location where the services were performed back to her base location, recalculates the cost for the services based on the location of where the services were performed, calculates the cost for the services performed based on the location of the customer's smart phone and the stylist's smart phone as determined by their GPS when the services were performed, generates an invoice based on the cost of the services; and transmits an invoice for the services performed to the customer.

4. A host computer system according to claim 3, wherein desired factors for a stylist consisting of location, schedule and availability are received with a rank of importance for each factor from the customer's smart phone.

5. A host computer system according to claim 3, wherein the customer manually enters in addition to the location identified by the GPS in the customer's smart phone additional information for the location for services, a general description of the area.

6. A host computer system according to claim 3, wherein the stylist manually enters in addition to the location identified by the GPS in the customer's smart phone additional information for her location, a general description of the area.

7. A host computer system according to claim 6, wherein the computer receives any dispute from the customer regarding the invoice.

8. A host computer system according to claim 7, wherein the computer transmits any dispute from the customer regarding the invoice to the chosen stylist.

* * * * *